(No Model.)
T. T. SABROE.
CREAM ELEVATOR.
No. 545,177.
Patented Aug. 27, 1895.
Fig. 1.
Fig. 2.
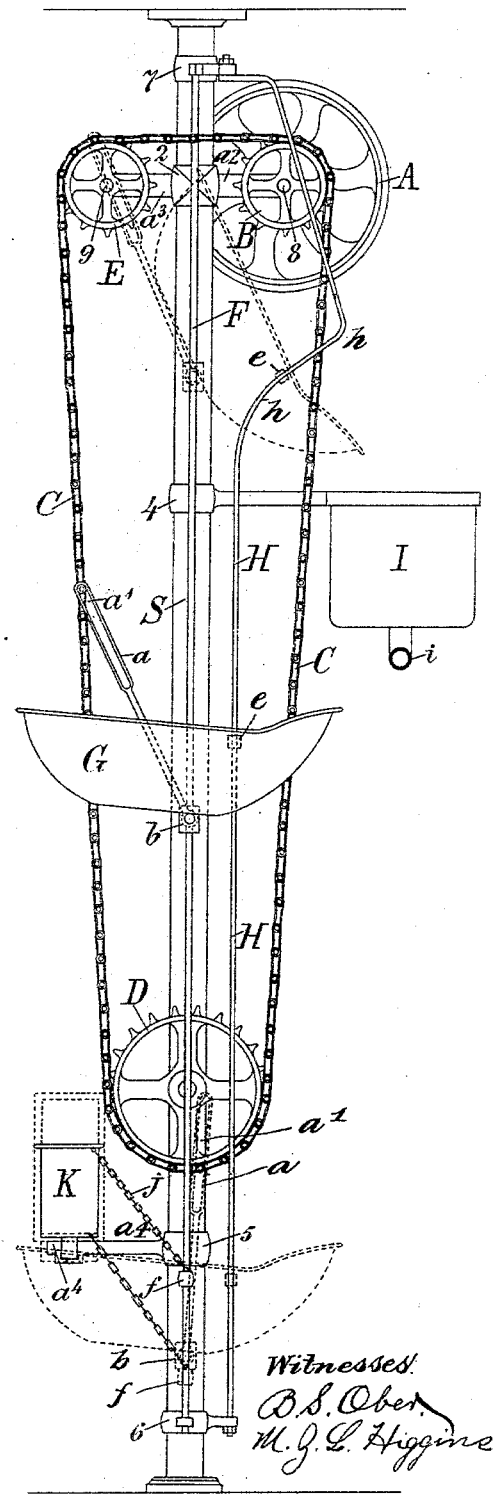
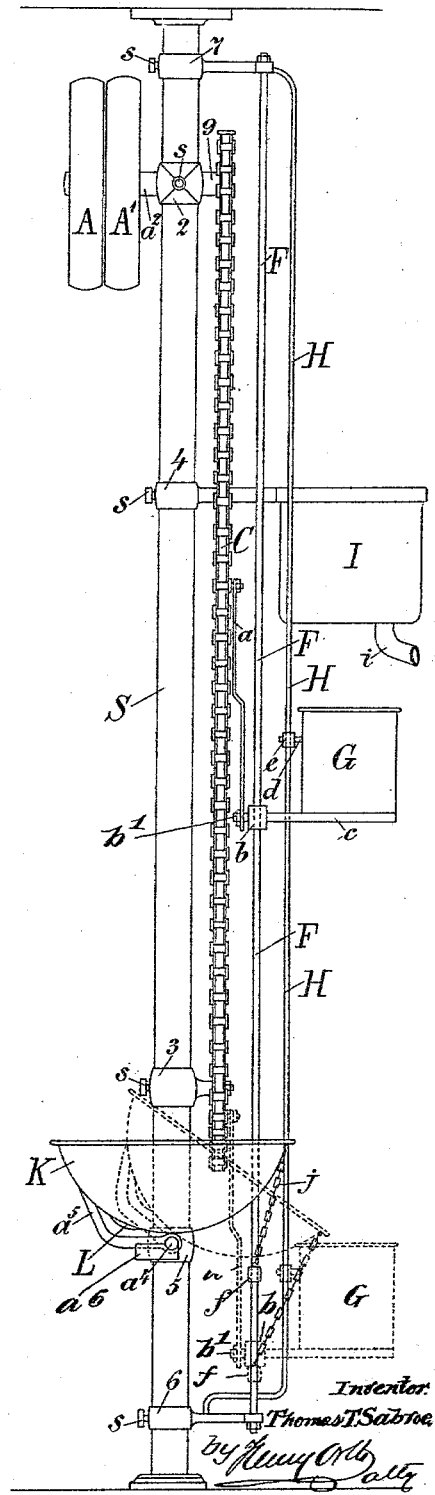
Witnesses
B. S. Ober
M. J. L. Higgins
Inventor:
Thomas T. Sabroe
by Henry Orth
atty

UNITED STATES PATENT OFFICE.

THOMAS THOMASSEN SABROE, OF AARHUUS, DENMARK.

CREAM-ELEVATOR.

SPECIFICATION forming part of Letters Patent No. 545,177, dated August 27, 1895.

Application filed September 1, 1894. Serial No. 521,950. (No model.)

*To all whom it may concern:*

Be it known that I, THOMAS THOMASSEN SABROE, a subject of the King of Denmark, residing at Aarhuus, in the Kingdom of Denmark, have invented certain new and useful Improvements in Cream-Elevators; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention has relation to endless-chain conveyers for conveying substances from one point to another; and it has for its object the provision of means whereby the buckets or other carriers are automatically charged or filled at the receiving end of the conveyer and in a like manner emptied at the delivery end of said conveyer, as will now be fully described, reference being had to the accompanying drawings, in which—

Figures 1 and 2 are side and rear elevations of an endless-chain carrier embodying my invention, and more particularly designed for use in creameries for the transferring of cream from the centrifugal separator or from a vessel that receives the cream from such separator to a pasteurizer or to a vessel adapted to deliver the cream to a pasteurizer.

In the above-described drawings, S indicates a pillar or column, of any desired cross-sectional form, extending from floor to ceiling of the dairy-room, and to said pillar are adjustably secured by means of set-screws or bolts $s$ a series of sleeves 2, 3, 4, 5, 6, and 7. The sleeve 2 has two arms projecting from opposite sides thereof. The arm $a^2$ on one side of the pillar has a bearing for a shaft 8, that carries a fast and a loose pulley A A', respectively, near one end, and a sprocket-wheel B at its opposite end, while the arm $a^3$ has a bearing for a shaft 9, that carries a sprocket-wheel E in line with sprocket-wheel B. The sleeve 3 has an arm or stud on which is mounted a sprocket-wheel D, and around said sprocket-wheels B E D passes an endless carrier-chain C, said wheels being arranged to form with the chain a triangle having rounded angles, the base of said triangle being at or near the upper end of the pillar S. The sleeve 4 has an arm from which is suspended a vessel I, adapted to receive the cream and deliver the same into a pasteurizing apparatus, (not shown,) a suitable pipe connection $i$ being provided for the purpose, and the sleeve 5 has a cylindrical arm $a^4$, that serves as a support for a vessel K, adapted to receive the cream from the centrifugal separator through the medium of a suitable pipe connection (not shown) or otherwise.

The vessel K is adapted to turn or tilt on the arm $a^4$, to which it is articulated through the medium of an arm $a^5$, that extends from the rear end of the vessel to about midway of its under side, the downward movement of said rear end of the vessel from a horizontal being prevented by an abutment $a^6$, extending from arm $a^4$ under arm $a^5$ and serving as a bearing for the latter. (See Fig. 2.) The vessel K is self-righting, it being weighted at its rear end in any suitable manner, as by a mass of metal L, Fig. 2. In order to facilitate the tilting of the vessel, I preferably make its bottom convex, as shown. The free end of vessel K is connected by a chain $j$ to a sleeve $f$, that has free motion along a guide-rod F, secured in arms projecting from the sleeves 6 and 7 near the foot and upper end, respectively, of pillar S, a second guide-rod H being connected with said sleeves at a suitable distance from guide-rod F. As shown in Fig. 1, the guide-rod H is parallel with guide-rod F for a certain distance in an upward direction, and then curves outwardly or away from said rod F, as shown at $h$, and from thence again extends inwardly or toward rod F to sleeve 7.

On the guide-rod F is loosely mounted a sleeve or carriage $b$, from which projects a cylindrical arm $c$, that serves as a support for the vessel or carrier-bucket G, which has free sliding motion on said support, the bottom of the vessel being flat, while its ends are curved outwardly and upwardly, substantially as shown in Fig. 1. At or near its free or discharge end the bucket G has a pin $d$, that projects from one side and has pivotal connection with a guide-sleeve $e$, adapted to slide freely on guide-rod H, while the carriage $b$ has a stud $b'$, Fig. 2, in the plane of the arm $c$ thereon, to which is pivoted a link $a$, slotted at $a'$, through which slot passes one of the chain-link pins whereby said link is pivotally connected with the carrier-chain C, and at the same time has endwise motion on its pivot-pin within the limits of its slot $a'$.

Although I have described a conveyer for conveying cream, it is obvious that other substances may be translated thereby from one point to another.

The movable sleeves $b$, $f$, and $e$ are preferably provided with rollers between which the guide-rods F and H pass with a view to reducing the friction and more accurately guiding said sleeves. I have deemed it unnecessary to illustrate this construction, as it involves a well-known expedient to attain the contemplated object.

The operation of the conveyer is as follows: The receiving-vessel K being supplied with cream and the chain-gearing set in motion, the latter will not be interrupted so long as the conveyer remains in operation. If it is now assumed that the bucket G is charged with cream and in the position shown in full lines in Fig. 1, it will be carried upward by the chain C, through the medium of the link $a$, and prevented from tilting by the guide-sleeve $e$; but as said guide-sleeve reaches the outwardly and upwardly curving portion $h$ of the guide-rod H its upward motion will be retarded relatively to the like motion of the link $a$ and carriage $b$, thereby gradually tilting the vessel until the pivot end of the link $a$ is about to enter the horizontal plane of its path with the chain, at which time the bucket is about fully tilted, as shown in dotted lines in Fig. 1, to discharge its contents into the delivery-vessel I, and during the travel of the link over the horizontal portion of its path the said bucket will remain in said position or practically so, thus allowing ample time for the discharge of its contents; but as said link end approaches the bucket the carriage $b$ commences to move down the rod F until said link end has reached the perpendicular portion of the chain on the right. As the link again moves downward, the bucket G moves downward also, its guide-sleeve $e$ moving inwardly along the curved portion $h$ of its guide-rod, whereby the bucket G is gradually righted on its supporting-arm $c$ until the said sleeve $e$ has again reached the vertical portion of its guide-rod, when the bucket will have returned to a normal position. As said bucket is about to reach the limit of its downward movement—that is to say, when the upper edge of the bucket is passing the corresponding edge of the receiving-vessel K, whose tilting motion is in a direction at right angles to that of the bucket G—the carriage $b$ of the latter will impinge upon the guide-sleeve $f$ on rod F and carry said sleeve along, the weight of the bucket and its carriage being sufficient to gradually tilt the vessel K, through the medium of the chain $j$, whereby the contents of the latter vessel are emptied into the bucket G. In practice the angle to which the vessel K is tilted, and consequently the length of the chain $j$, is so chosen that the bucket-link $a$ cannot move downward to its full length below the chain-wheel D, so that the pivot-pin of said link will move along the slot $a'$ of the latter as said pin approaches the lowermost point of its travel, at which time it will lie at or near the inner end of said slot, and at this time the vessel K will have been tilted to its greatest angle, so that said link will not be carried along with the chain in an upward direction as soon as its pivot-pin has passed the aforesaid lowest point in its travel, thus causing the bucket G to remain stationary for a moment and afford ample time for the filling of the bucket until said pivot-pin has traveled far enough in an upward direction to again reach the outer end of the slot $a'$. By means of this arrangement it is not necessary to interrupt the feed of cream to vessel K while the latter is discharging into bucket G, for about as soon as said bucket is sufficiently full it will commence to move upwardly, allowing the vessel K, assisted by the counterweight, to right itself again. Inasmuch as the tilting of vessel K is effected slowly and gradually there is no danger of spilling the cream, which might happen if the said vessel were rapidly or suddenly tilted. Of course this arrangement would not be absolutely necessary in the conveyance of solid substances.

As stated, the link $a$ is connected to one of the chain-link pivots that projects sufficiently from said links to prevent the latter from being caught or interfered with by the gearing, and by the arrangement of the operative devices the movements of the conveyer-chain need not be interrupted either during the charging or discharging of the buckets, while but comparatively little power is required to operate the conveyer.

By providing means whereby all the sleeves 2, 3, 4, 5, 6, and 7 can be separately adjusted any slack in the chain C can be readily taken up and the parts supported by the sleeves can be adjusted relatively to each other so as to give the best results. Furthermore, in the construction of conveyer or elevator but a single main support is used, so that the apparatus will take up but a comparatively small space, while the construction described is of the simplest nature.

Having thus described my invention, what I claim as new therein, and desire to secure by Letters Patent, is—

1. A continuously movable endless chain conveyer, a bucket, a link connected therewith and having endwise or sliding motion on one of the chain link pins, and a guide for the bucket, whereby when said bucket reaches a given point of its travel it will remain stationary for a period of time, for the purpose set forth.

2. An endless chain conveyer, comprising a conveyor chain arranged in the form of a triangle, with one base at the delivery end of the conveyer, a carriage, a guide rod F along which the carriage is adapted to travel, said carriage provided with a supporting arm, a link connecting the carriage with the conveyer chain, a bucket seated on the supporting arm of the carriage, a guide sleeve pivotally connected with the discharge end of said bucket, a guide rod H along which the sleeve is adapted to travel, said rod being parallel with the rod F for a certain distance and curving away from the rod near the delivery end of the conveyer, for the purpose set forth.

3. An endless conveyer comprising a conveying chain, a bucket connected therewith, a guide rod, a bucket support adapted to travel along the rod, a vessel at the receiving end of the conveyer chain adapted to tilt in one direction on its support, a slide on the guide rod adapted to be engaged by the bucket support and moved along with it, and a connection between the slide and discharge end of the vessel, whereby the latter is tilted by the bucket to discharge into the same when said bucket has reached a proper position, and means for returning the vessel into a normal position, substantially as and for the purpose set forth.

4. An endless chain conveyer comprising a conveyer chain, a carriage, a guide rod F along which the carriage is adapted to travel, said carriage provided with a supporting arm, a link pivotally connected with the carriage and the conveyer chain, a bucket resting on the supporting arm of the carriage, a guide sleeve pivotally connected with the bucket near its discharge end, and a guide rod H along which said sleeve is adapted to travel, in combination with a receiving vessel, a support therefor on which said vessel is adapted to tilt, a slide on guide rod F connected with the discharge end of the vessel, said slide adapted to be engaged by the bucket carriage and moved along therewith, thereby tilting the receiving vessel when the bucket has reached a position to receive the contents of said vessel, substantially as set forth.

5. An endless chain conveyer, comprising a conveyer chain, a carriage, a guide rod F along which the carriage is adapted to travel, said carriage provided with a supporting arm, a longitudinally slotted link pivotally connected with the carriage and the conveyer chain, a bucket resting on the supporting arm of the carriage, a guide sleeve pivotally connected with the bucket near its discharge end, and a guide rod H along which said sleeve is adapted to travel, in combination with a receiving vessel, a support therefor on which said vessel is adapted to tilt, a slide on guide rod F, a flexible connection between the slide and discharge end of the vessel, said connection shorter than the link that connects the bucket carriage to the conveyer chain, said slide adapted to be engaged by the bucket carriage and moved along therewith, thereby tilting the receiving vessel when the bucket has reached a position to receive the contents of said vessel, substantially as set forth.

6. In combination, the pillar S, the sleeves 2 and 3 adjustable thereon, the sprocket wheels B, E, supported from sleeve 2, the sprocket wheel D supported from sleeve 3, the conveyer chain C, the guide rods F, H, supported from the pillar, said guide rod H curved outwardly at $h$, the carriage $b$ on rod F provided with a supporting arm, as $c$, a link pivotally connecting said carriage with one of the chain link pivots, a bucket seated on the arm $c$, and a slide, as $e$, on the aforesaid rod H connected with the bucket near its discharge end, substantially as and for the purpose set forth.

7. In combination, the pillar S, the sleeves 6 and 7 adjustable thereon, the guide rods F, H, secured to said sleeves, the sprocket wheels, B, E, D, supported from the pillar the conveyer chain passing around said wheels, the vessel K adapted to tilt in one direction on its support, said vessel and sprockets adjustably supported from the pillar, a slide on rod F, a flexible connection between the slide and discharge end of vessel K, a carriage on said rod F adapted to engage the slide and move the same along the rod F, a carriage linked to the conveyer chain and provided with a supporting arm, a bucket seated on said arm, and a sleeve adapted to slide on rod H, connected with the discharge end of the bucket, substantially as and for the purpose set forth.

In testimony whereof I have hereunto signed my name to this specification in presence of two subscribing witnesses.

THOMAS THOMASSEN SABROE.

Witnesses:
ROBT. J. KIRK,
FLORENTUR KLACH.